(12) United States Patent
Kammer et al.

(10) Patent No.: US 7,509,417 B1
(45) Date of Patent: Mar. 24, 2009

(54) METHOD FOR INTELLIGENTLY SELECTING A WIRELESS COMMUNICATION ACCESS POINT

(75) Inventors: David Kammer, Seattle, WA (US); Jeffry Loucks, Gig Harbor, WA (US); David Fish, Lake Stevens, WA (US); Jeffrey Frank, Redmond, WA (US)

(73) Assignee: Palm, Inc., Sunnyvale, CA (US)

( * ) Notice: Subject to any disclaimer, the term of this patent is extended or adjusted under 35 U.S.C. 154(b) by 641 days.

(21) Appl. No.: 10/086,313

(22) Filed: Feb. 28, 2002
(Under 37 CFR 1.47)

(51) Int. Cl.
*G06F 15/16* (2006.01)

(52) U.S. Cl. .................. 709/225; 709/204; 709/206; 709/217; 709/245; 455/122; 455/412.1; 370/338; 370/329

(58) Field of Classification Search ......... 709/220–225, 709/227–229, 238, 244, 203, 217; 455/3.01, 455/456; 370/230, 277, 331, 401, 338; 342/387, 342/457; 705/59
See application file for complete search history.

(56) References Cited

U.S. PATENT DOCUMENTS

| | | | |
|---|---|---|---|
| 5,010,547 A | 4/1991 | Johnson | |
| 5,012,219 A | 4/1991 | Henry | |
| 5,075,684 A | 12/1991 | DeLuca | |
| 5,359,317 A | 10/1994 | Gomez | |
| 5,394,140 A | 2/1995 | Wong | |
| 5,430,436 A | 7/1995 | Fennell | |
| 5,612,682 A | 3/1997 | DeLuca | |
| 5,650,776 A | 7/1997 | Mitchell | |
| 5,705,995 A | 1/1998 | Laflin | |
| 5,724,346 A * | 3/1998 | Kobayashi et al. | 370/329 |
| 5,903,852 A | 5/1999 | Schaupp, Jr. | |
| 5,958,006 A | 9/1999 | Eggleston | |
| 6,157,630 A | 12/2000 | Adler | |
| 6,377,782 B1 * | 4/2002 | Bishop et al. | 455/3.01 |
| 6,505,243 B1 * | 1/2003 | Lortz | 709/220 |
| 6,526,275 B1 * | 2/2003 | Calvert | 455/418 |
| 6,700,535 B2 * | 3/2004 | Gilkes et al. | 342/387 |
| 6,744,753 B2 * | 6/2004 | Heinonen et al. | 370/338 |
| 6,842,621 B2 * | 1/2005 | Labun et al. | 455/456.3 |
| 6,847,823 B2 * | 1/2005 | Lehikoinen et al. | 455/456.1 |
| 6,850,252 B1 * | 2/2005 | Hoffberg | 715/716 |
| 7,016,325 B2 * | 3/2006 | Beasley et al. | 370/331 |
| 7,151,764 B1 * | 12/2006 | Heinonen et al. | 370/338 |
| 2001/0011254 A1 * | 8/2001 | Clark | 705/59 |
| 2002/0142771 A1 * | 10/2002 | Saifullah et al. | 455/436 |

* cited by examiner

*Primary Examiner*—Jude J Jean Gilles (57) ABSTRACT

A method and system for selecting and connecting to an access point in a wireless network of devices, such as a Bluetooth network. Initially, an initiator device is preconfigured with a list of available access point addresses. The initiator device broadcasts an inquiry message that is received by available wireless devices which, in turn, respond with their respective addresses, occupancy level and device classification. The initiator device compares the respondent addresses with the preconfigured access point addresses and connects to a match, thus terminating the inquiry, provided certain fitness functions are satisfied. The fitness functions might include such considerations as occupancy rate, device classification, signal strength, or physical distance of separation. The list of addresses on the initiator device is updated automatically upon connecting with a network server whenever a new device is added or an old one removed from the network server's access point address list.

16 Claims, 9 Drawing Sheets

METHOD FOR INTELLIGENTLY SELECTING A WIRELESS COMMUNICATION ACCESS POINT

TECHNICAL FIELD

The embodiments of the present invention relate to networks of devices that can be connected using wireless links, in particular devices that use the Bluetooth technology. Specifically, embodiments of the present invention pertain to a method and system for selecting and connecting to wireless access point within a local area network.

BACKGROUND ART

Computer systems and other types of consumer electronic devices are commonly linked to each other and to peripheral devices using a myriad of different types of cables and connectors. As these devices grow in number and variety, their cables and connectors can often become quite cumbersome to work with. Accordingly, efforts are underway to develop technologies allowing hardware connections to be replaced with wireless ones.

One such technology is the Bluetooth wireless communication technology. Bluetooth is the code name for a technology specification for short-range radio links that will allow the many proprietary cables that connect devices to one another to be replaced with short-range radio links.

The Bluetooth technology is based on a high-performance, yet low-cost, integrated radio transceiver. For instance, Bluetooth transceivers built into both a cellular telephone and a laptop computer system would replace the cables used today to connect a laptop to a cellular telephone. Printers, personal digital assistants (palmtop computer systems, hand-held devices and the like), desktop computer systems, fax machines, keyboards, joysticks and virtually any other digital device can be part of a Bluetooth system. Bluetooth radio technology can also provide a universal bridge to existing data networks and a mechanism to form small private ad hoc groupings ("scatternets" or "piconets") of connected devices away from fixed network infrastructures.

The Bluetooth technology allows Bluetooth devices to "discover" other Bluetooth devices that are within range and then connect with those devices, either automatically or at a user's discretion. The Generic Access Profile (GAP) of the Bluetooth specification (Section 6 of "Specification of the Bluetooth System, Core," version 1.0B, dated Dec. 1, 1999, herein incorporated by reference as background) describes the processes by which Bluetooth devices discover each other. The device discovery process has two primary steps: an inquiry step (described in Sections 6.1 and 6.2 of the Bluetooth specification), and a name discovery step (described in Section 6.3 of the Bluetooth specification). In the inquiry step, the Bluetooth devices make their presence known to each other and exchange attributes (e.g., addresses) needed to further the connection process. In the name discovery step, user-friendly names are exchanged to help a user identify Bluetooth devices that are in the environment. The inquiry and discovery steps are described in further detail below.

Figure 1:
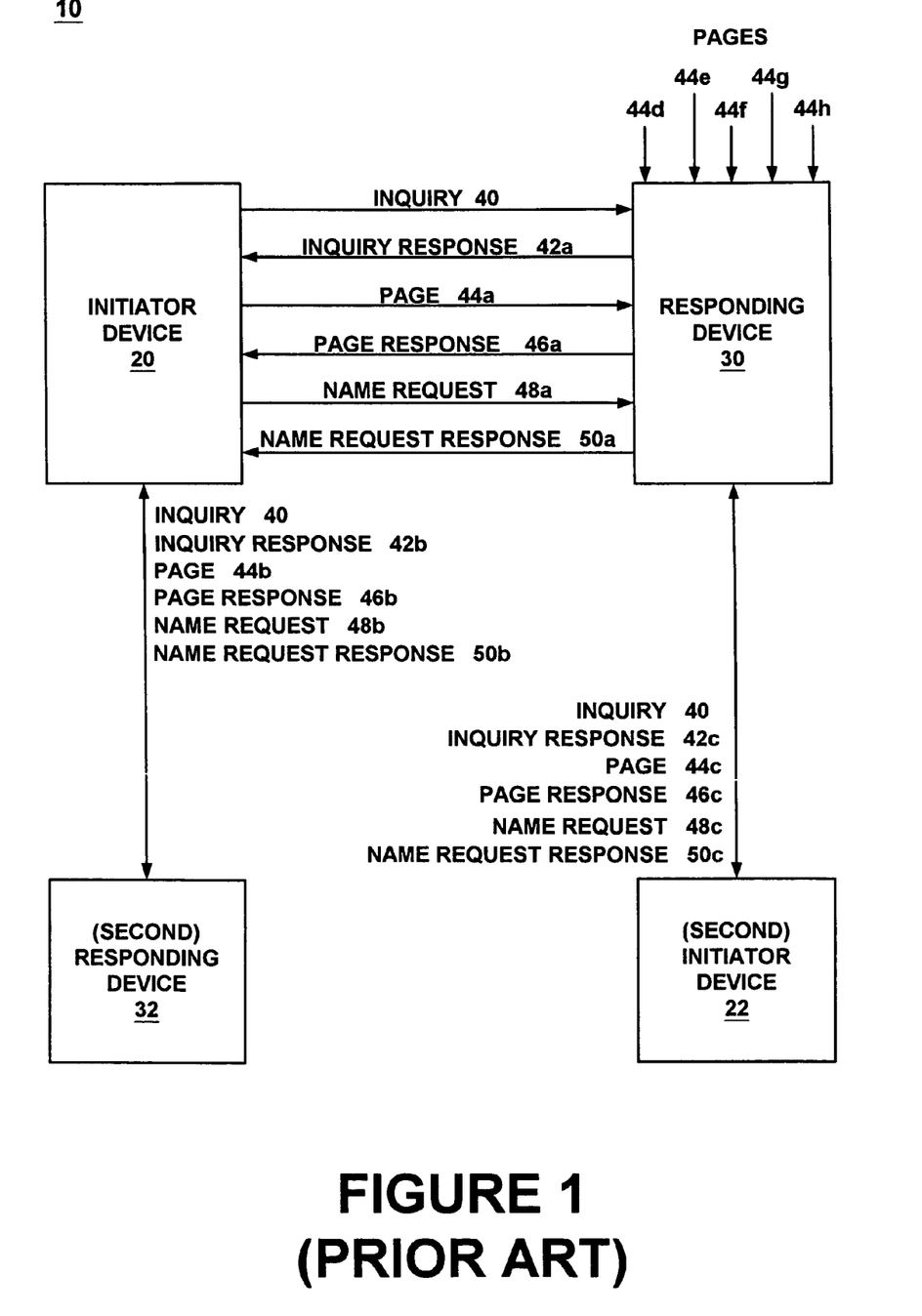
FIG. 1 is a data flow diagram illustrating one embodiment of a prior art device discovery process.

Prior Art FIG. 1 is a data flow diagram 10 illustrating the device discovery process used by one Bluetooth device (initiator device 20) to discover another Bluetooth device (e.g., responder device 30). First, initiator device 20 sends (broadcasts) a general inquiry message (e.g., inquiry 40) over the nominal range of a typical Bluetooth device (e.g., approximately 10 meters). When initiator device 20 broadcasts an inquiry 40, it typically remains in the inquiry state for 10.24 seconds (this time is programmable, but the Bluetooth specification recommends 10.24 seconds).

In order to receive and respond to inquiry 40, responder devices 30 and 32 must be "discoverable" (e.g., the devices must be scanning for inquiry messages). According to the Bluetooth specification referenced above, a discoverable device enters into "inquiry scan" (scanning for inquiry messages) every 2.56 seconds and remains in inquiry scan for 10.625 milliseconds.

Responder devices 30 and 32 send inquiry responses 42a and 42b, respectively, to initiator device 20 in response to inquiry 40. Inquiry responses 42a and 42b provide the Bluetooth device addresses (a numerical address or a device access code) for responder devices 30 and 32, and optionally provide additional information such as the clock, class of device and page scan mode. Inquiry responses 42a and 42b do not provide a name (or user-friendly name) for responder devices 30 and 32. The user-friendly name can be up to 248 characters long and is not provided in order to reduce the length of the inquiry responses.

Initiator device 20 can therefore receive an inquiry response from multiple Bluetooth devices (e.g., responder devices 30 and 32), providing each device's numerical address at least. Generally, a user will not be able to identify one type of responder device over another based only on the device's numerical address. For example, there may be two printers in proximity, and the user generally will not be able to tell which printer to connect with based on the numerical address. However, "user-friendly names" can be used to identify each printer's location and features, allowing the user to make a selection of one over the other. Therefore, initiator device 20 needs to discover and display the user-friendly name for each of the devices that responded, so that the user can select the appropriate device with which to connect.

To accomplish this, initiator device 20 must connect one device at a time to each of the responder devices 30 and 32 in order to request a user-friendly name. Accordingly, initiator device 20 sends pages 44a and 44b to each device that responded to inquiry 40. In response to the pages 44a and 44b, responder devices 30 and 32 send page responses 46a and 46b, respectively. Page responses 46a and 46b provide the user-friendly name for responder devices 30 and 32, respectively.

Next, initiator device 20 will send name requests 48a and 48b to responder devices 30 and 32, respectively. In response to name request 48a, responder device 30 sends name request response 50a to initiator device 20. Similarly, in response to name request 48b, responder device 32 sends name request response 50b to initiator device 20. Name request responses 50a and 50b provide the user-friendly names for responding devices 30 and 32, respectively. The user-friendly names are displayed to the user, who can then select one or more of the responder devices with which to connect.

There are a number of disadvantages associated with the Bluetooth device discovery process described above. One disadvantage is that, in the name discovery step of the device discovery process, each device provides its user-friendly name for display to the user. As the number of Bluetooth devices continues to grow, the length of the list of user-friendly names will grow as well, which can complicate the user experience. A user who has changed locations within a building and who wishes to connect a wireless electronic device, such as a portable computer or a personal digital assistant, with a network needs to locate a convenient access point in a new location. In order to do so, the device goes through the discovery process in order to locate a Bluetooth access point through which to connect to the network. The more devices that are available, the longer the discovery process takes. Without the name discovery, a user would not be able to easily interpret the addresses returned at the end of the name retrieval phase and select an appropriate access point device for connecting to the network.

The Bluetooth Specification contains no method for specifying that different LAN Access Points (LAPs) are part of the same network. As such, as a user moves about in an environment with multiple access points (such as an enterprise environment), the user must spend time specifying which access point he or she wants to use, based upon their location. When the user encounters a new access point, even more time may have to be spent configuring the device to use the access point. Such a problem is annoying and it requires the user to have a fair amount of knowledge about the environment (i.e., which access points are where), or to constantly go through the lengthy discovery process in each new location, neither of which are very user-friendly or expedient.

Yet another problem with the Bluetooth device discovery process is that some access points, depending on their location, get a higher volume of usage than others do. Connecting to an access point with a high occupancy rate may slow communication speed between the user device and the network.

Thus, the Bluetooth device discovery process presents a number of problems. Finding a solution to these problems is made more complex because the solution must be substantially compliant with the Bluetooth specification. That is, many Bluetooth devices are being designed and manufactured according to the Bluetooth specification. Consequently, a solution that relies on a significant deviation from the Bluetooth specification will create new problems, such as incompatibility between newer Bluetooth devices and legacy Bluetooth devices. An aim of the Bluetooth specification is to provide a level of standardization across all Bluetooth devices, and a substantial deviation from the specification would be contrary to that aim. Accordingly, any solution to the prior art problems described above should be satisfactorily consistent with the Bluetooth specification, or it should be a solution that can be incorporated into legacy Bluetooth devices.

DISCLOSURE OF EMBODIMENTS OF THE INVENTION

Accordingly, a need exists for a system and/or method for intelligently selecting and connecting to a wireless communication access point. A need also exists for a system and/or method that can satisfy the above need and that can reduce the time required for examining all the available choices prior to making a selection. In particular, a need exists for a system and/or method that can satisfy the above needs and that is consistent with the Bluetooth specification, and that can be implemented in Bluetooth-enabled devices including legacy Bluetooth devices. What is also needed is a system and/or method that can satisfy the above needs and that is user-friendly. The embodiments of the present invention provide these advantages and others not specifically mentioned above but described in the sections to follow.

Embodiments of the present invention pertains to a method and system for selecting and connecting to an access point in a wireless network of devices, such as a Bluetooth network. Initially, an initiator device is preconfigured with a list of available access point addresses (e.g., made available by a network administrator). The initiator device broadcasts an inquiry message that is received by available wireless devices which, in turn, respond with their respective addresses, occupancy level and device classification. The initiator device compares the respondent addresses with the preconfigured access point addresses and connects to an address on the list, thus terminating the inquiry, provided certain fitness functions are satisfied. The fitness functions might include such considerations as occupancy rate, device classification, signal strength, or physical distance of separation. The list of addresses on the initiator device is updated automatically upon connecting with a network server whenever a new device is added or an old one removed from the network server's access point address list. It is understood that the device may be preconfigured with a list of access point addresses that are pre-allocated so as to limit the access points available to a device in order to balance the occupancy load in a physical location. It is also possible to bias the fitness function requirements so as to balance the occupancy load in a particular location. Authentication data may be preconfigured to eliminate lengthy sign-ons each time access is requested.

More specifically, embodiments use an intelligent mixture of pre-configured information and Bluetooth intelligence. A database file, listing all of the available LAPs on the network could be created and distributed by an Information Systems (IT) group (this list could be hot-synced, beamed, etc. to the Bluetooth devices). In an open network environment such as a mall, the access points themselves could push the network database file to the handheld device using Bluetooth wireless communication whenever the device entered the environment for the first time. Once the database is installed, the user simply needs to select the network upon entering the environment. Alternatively, the device could be instructed to detect the environment based upon the presence of certain other Bluetooth devices, and switch to the network database list automatically.

When the user goes to use a network application, the Bluetooth device will quickly begin an inquiry, looking for available devices. Such an inquiry could be performed transparently and very quickly, since it could be cancelled as soon as an acceptable device is found. Acceptance of a LAP could be based upon any number of predefined heuristics ("fitness" functions) such as: inclusion in the current network list, the load or occupancy of the LAP (returned in the inquiry response), the signal strength of the LAP, etc. If desired, multiple levels of fall-back preferences could be defined if an acceptable device is not found before the inquiry process completes.

After selecting a LAP, the Bluetooth device will connect to the LAP. If the connection fails, the device may retry or fall back to a second selection. Any authentication or password information that the LAP requires could be included in the network database or requested from the user, depending on the desired level of security.

In another Bluetooth embodiment, in an initiator device that has a wireless transceiver and a memory cache containing a list of access point addresses, a method for selecting and connecting to a responding access point device is described. This method includes broadcasting a first wireless signal to be received by a responding device and receiving a second wireless signal from the responding device. The second wireless signal is sent in response to the first wireless signal and contains an address for the responding device. Next, the list of access point device addresses is accessed from the memory cache and searched for the address of the responding device. If the address of the first responding device is not found, the process continues to receive wireless signals from responding devices until a device address is found in the list of access point addresses. The initiator device connects with a responding device having an address found within the list of access point addresses, provided fitness function requirements are satisfied, thus terminating the inquiry phase and shortening the discovery process. Fitness function requirements may include, but not be limited to, requirements that the access point occupancy be less than a predetermined value, that the access point signal strength be greater than a predetermined value, or that the access point reside within a predetermined physical distance.

In another embodiment of the present invention, a method for updating a list of access point addresses residing in a memory cache of a wireless communication device having a wireless transceiver is presented. This method includes connecting the wireless communication device with a network server, the network server containing a list of current network access point addresses for a network. Next, the list of access point addresses is compared to the list of current network access point addresses. Any addresses found on the list of current network access point addresses and not found on the list of access point addresses are added to the list of access point addresses in the memory cache of the wireless communication device. Any addresses not found on the list of current network access point addresses and found on the list of access point addresses are deleted from the list of access point addresses in the memory cache of the wireless communication device.

Embodiments of the present invention afford the advantages of removing a need for the user to have special knowledge of the environment, removing the need for the user to make a selection each time the network is accessed, and removing the need for the user to configure LAP devices that they have not seen before. The time to make a network connection is greatly reduced since a full discovery (10 seconds-60 seconds or more) is replaced with a partial inquiry (approximately 2 seconds on average in a good environment).

These and other objects and advantages of the embodiments of the present invention will become obvious to those of ordinary skill in the art after having read the following detailed description of the embodiments which are illustrated in various drawing figures.

BRIEF DESCRIPTION OF THE DRAWINGS

The accompanying drawings, which are incorporated in and form a part of this specification, illustrate embodiments of the invention and, together with the description, serve to explain the principles of the embodiments of invention.

PRIOR ART

DETAILED DESCRIPTION OF EMBODIMENTS OF THE INVENTION

References will now be made in detail to the embodiment of the present invention, examples of which are illustrated in accompanying drawings. While the invention will be described in conjunction with the embodiments, it will be understood that they are not intended to limit the invention to these embodiments. On the contrary, the embodiments of the present invention are intended to cover alternatives, modifications and equivalents, which may be included within the spirit and scope of the invention as defined by the appended claims. Furthermore, in the following detailed description of the embodiments of the present invention, numerous specific details are set forth in order to provide a thorough understanding of the embodiments of the present invention. However, it will be obvious to one of ordinary skill in the art that the embodiments of the present invention may be practices without these specific details. In other instances, well-known methods, procedures, components, and circuits have not been described in detail so as not to unnecessarily obscure aspects of the embodiments of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "checking," "connecting," "setting," "storing," "scanning," "receiving," "sending," "updating," "disregarding," "entering," or the like, refer to the action and processes (e.g., process 800 of FIG. 8) of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

The embodiments of the present invention are described primarily in a context in which devices and systems are coupled using wireless links, and specifically with regard to devices and systems compliant with the Bluetooth technology. Bluetooth is the code name for a technology specification for small form factor, low-cost, short-range radio links between personal computers (PCs), personal digital assistants (PDAs), mobile phones and other devices. The Bluetooth technology allows cables that connect devices to one another to be replaced with short-range radio links. However, it is appreciated that the embodiments of the present invention may be utilized with devices and systems coupled using technologies and/or protocols different from Bluetooth, including but not limited to infrared communications links as defined by Infrared Data Association (IrDA).

In the parlance of Bluetooth, a collection of devices connected in a Bluetooth system is referred to as a "piconef" or a "subnet." A piconet starts with two connected devices, such as a computer system and a cellular phone, and may grow to eight connected devices. All Bluetooth devices are peer units; however, when establishing a piconet, one unit will act as a master and the other(s) as slave(s) for the duration of the piconet connection.

A Bluetooth system supports both point-to-point and point-to-multi-point connections. Several piconets can be established and linked together in a "scatternet," where each piconet is identified by a different frequency hopping sequence. All devices participating on the same piconet are synchronized to their respective hopping sequence.

Figure 2A:
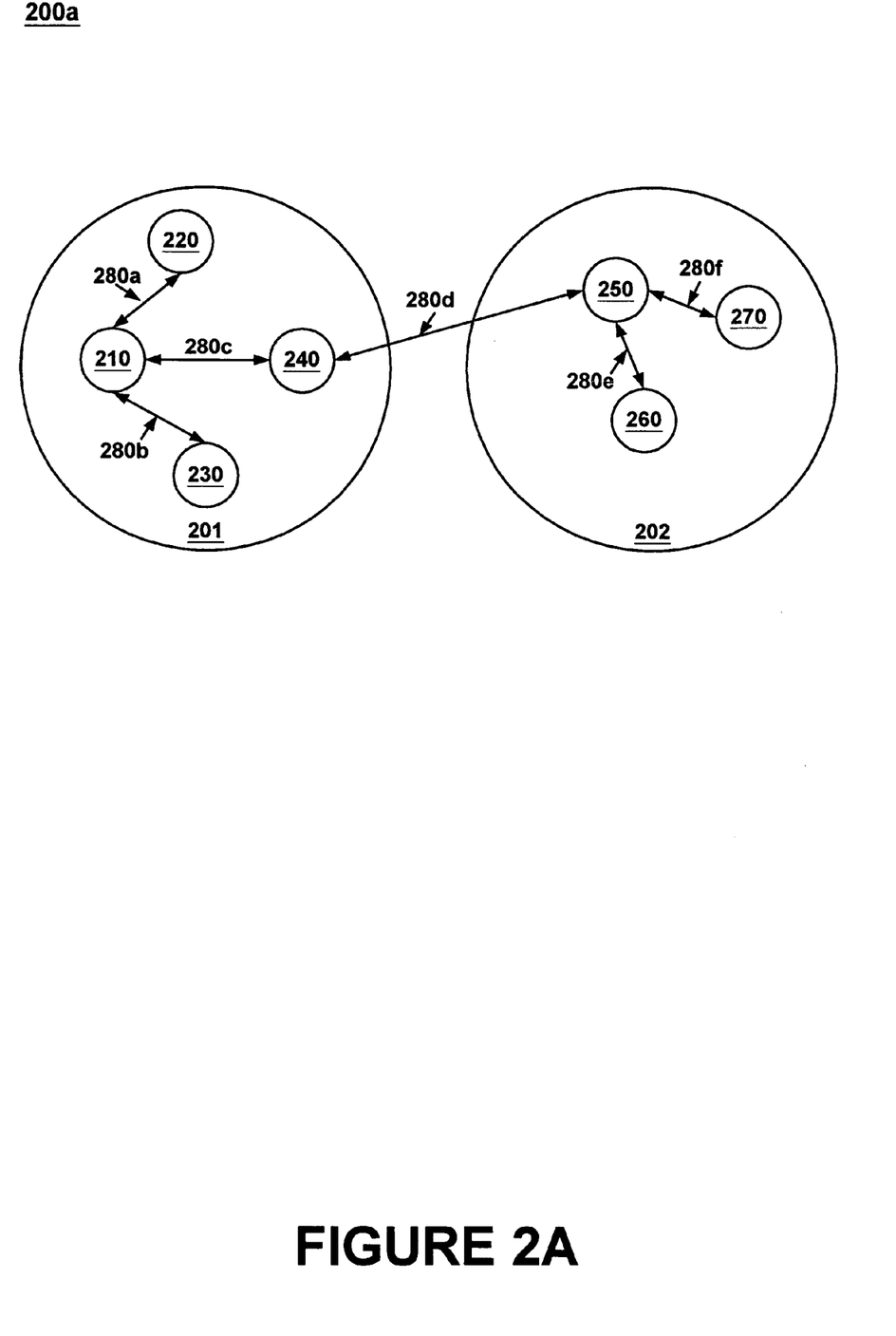
FIG. 2A illustrates a network of devices coupled using wireless connections in accordance with one embodiment of the present invention.

FIG. 2A illustrates the topology of a network 200a of devices coupled using wireless connections in accordance with one embodiment of the present invention. Devices 210, 220, 230 and 240 are coupled in piconet 201 using wireless connections 280a-c. Similarly, devices 250, 260 and 270 are coupled in piconet 202 using wireless connections 280e-f. Piconet 201 and piconet 202 are coupled using wireless connection 280d. Devices 210-270 can be printers, personal digital assistants (PDAs), desktop computer systems, laptop computer systems, access points for local area networks, cell phones, fax machines, keyboards, joysticks and virtually any other device. In the present embodiment, devices 210-270 are Bluetooth devices; that is, they are equipped with a Bluetooth radio transceiver, or they are adapted to communicate with Bluetooth devices ("Bluetooth-enabled"). The Bluetooth radio transceiver may be integrated into a device, or it may be coupled to a device.

Figure 2B:
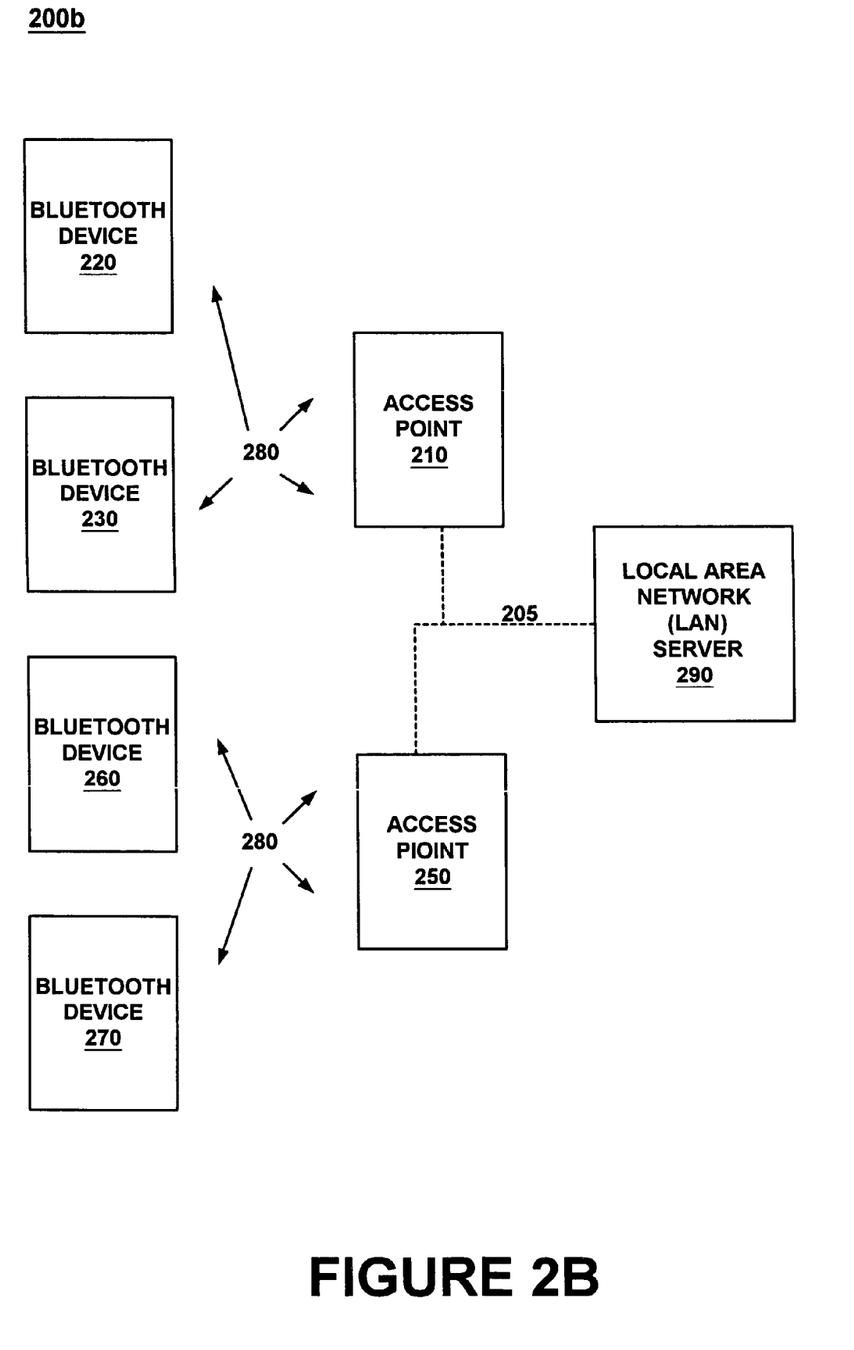
FIG. 2B illustrates a network of devices coupled to a local area network via access point devices in accordance with one embodiment of the present invention.

Another embodiment of the present invention, a method for intelligently selecting a Bluetooth access point from a plurality of available access points, includes a system for communication between a Bluetooth client device and a Bluetooth access point. FIG. 2B illustrates an exemplary wireless network environment 200b in which one embodiment of the present invention may be practiced. The illustrated wireless network environment 200b includes access to a local area network (LAN) via LAN server 290 coupled to access point 210 and to access point 250 via connection 205. In one embodiment, connection 205 is a physical (e.g., wired) connection, such as that in an Ethernet, token ring, or fiber optic network configuration. In another embodiment, connection 205 is a wireless connection utilizing wireless communication techniques such as infrared transmission, spread spectrum radio transmission, narrow band radio transmission, or other technology that does not require a physical (wired) connection between LAN server 290 and access point 210 and access point 250.

Still referring to FIG. 2B, it should be appreciated that in another embodiment, there may be only a single access point coupled with LAN server 290 via connection 205. It should be further appreciated that in yet another embodiment, more than the two access points shown in FIG. 2B may be coupled to LAN server 290. Depending on the scope of the network environment in which embodiments of the present invention are implemented, in still another embodiment, there may be from tens to hundreds of access points coupled with LAN server 290.

Still referring to FIG. 2B, wireless network environment 200b may include multiple wireless client devices (e.g., wireless client devices 220, 230, 260, and 270, respectively) coupled with access point 210 and access point 250 via wireless connection 280. It should be appreciated that the wireless client devices 220, 230, 260, and 270 are each able to communicate with either of the access points 210 or 250. Additionally, connection 280, a wireless connection, utilizes wireless communication techniques such as infrared transmission, spread spectrum radio transmission, narrow band radio transmission, or other technology that does not require a physical (e.g., wired) connection between network devices 210 and 250 and the wireless clients 220, 230, 260, and 270. Wireless client devices 220, 230, 260, and 270, network devices 210 and 250, and LAN server 290 may be implemented with an electronic system, for example electronic system 400 of FIG. 4. In the present embodiment, the wireless client devices, network devices, and the LAN server are coupled to a number of network resources, e.g., file servers, printers, Internet gateways, etc., via connection 280 and 205.

Figure 3:
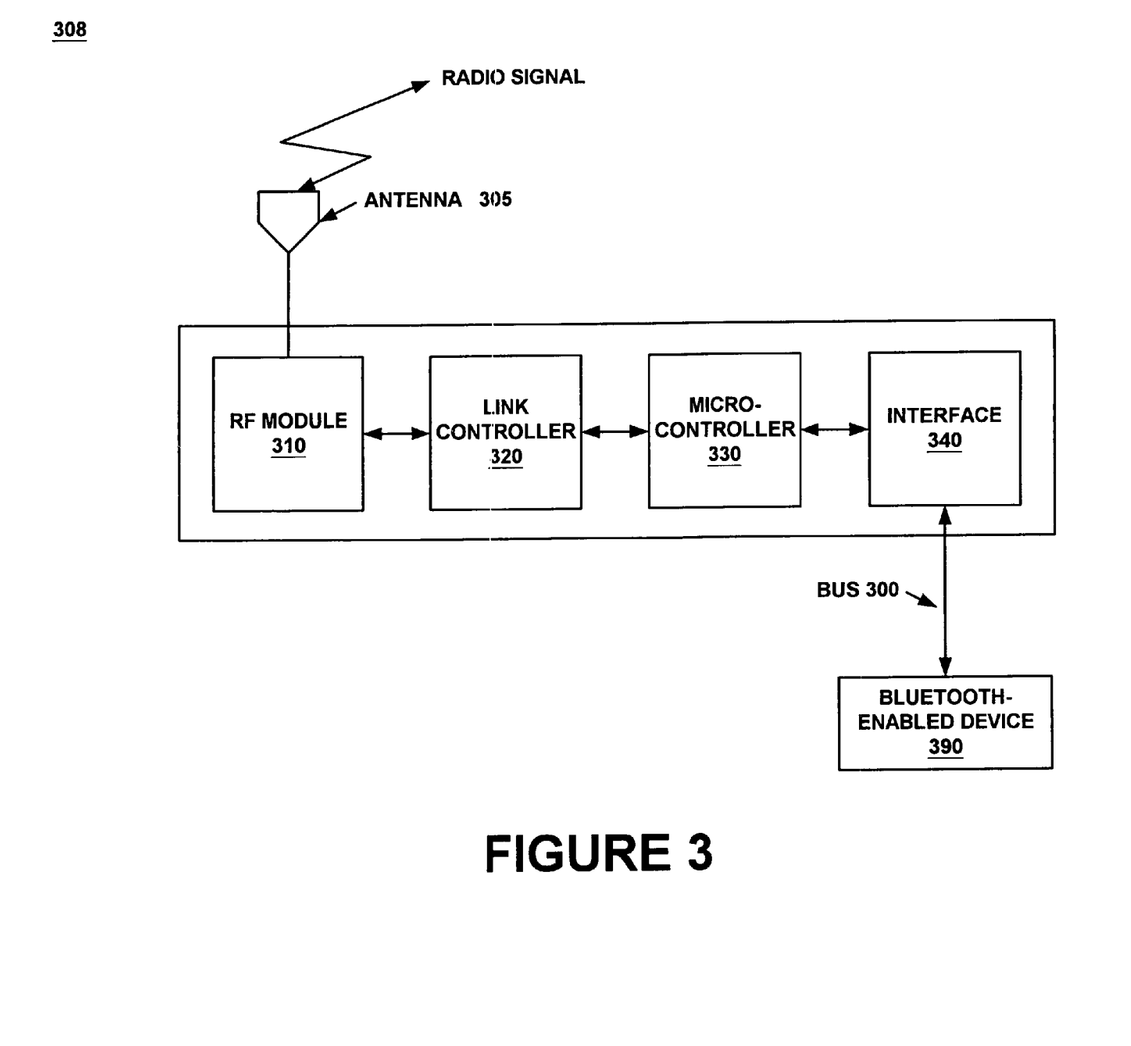
FIG. 3 is a block diagram showing one embodiment of a Bluetooth wireless transceiver in accordance with an embodiment of the present invention.

FIG. 3 is a block diagram of one embodiment of a transceiver 308 in accordance with one embodiment of the present invention. In one a preferred embodiment (the "Bluetooth embodiment"), transceiver 308 is a Bluetooth device comprising a digital component (e.g., a Bluetooth controller) and an analog component (e.g., a Bluetooth radio).

In the present embodiment, transceiver 308 comprises an antenna 305 for receiving or transmitting radio signals, a radio frequency (RF) module 310, a link controller 320, a microcontroller (or central processing unit) 330, and an external interface 340. In the present embodiment, transceiver 308 is coupled by a system bus 300 to a Bluetooth-enabled device 390 (e.g., a host device such as a computer system or similar intelligent electronic device, a PDA, a printer, a fax machine, etc.). However, it is appreciated that in another embodiment, transceiver 308 may be integrated into Bluetooth-enabled device 390.

In the Bluetooth embodiment, RF module 310 is a Bluetooth radio. The Bluetooth radio can provide: a bridge to existing data networks, a peripheral interface, and a mechanism to form piconets of connected devices away from fixed network infrastructures (see FIG. 2A).

Bluetooth radios operate in the ISM (Industrial, Scientific, Medical) band at 2.4 GHz. A frequency hop transceiver is applied to combat interference and fading. Bluetooth uses a packet-switching protocol based on a frequency hop scheme with 1600 hops/second. Slots can be reserved for synchronous packets. A packet nominally covers a single slot, but can be extended to cover up to five slots. Each packet is transmitted in a different hop frequency. The entire available frequency spectrum is used with 79 hops of one (1) MHz bandwidth, defined analogous to the IEEE (Institute of Electronic and Electrical Engineering) 802.11 standard. The frequency hopping scheme is combined with fast ARQ (Automatic Repeat Request), cyclic redundancy check (CRC) and Forward Error Correction (FEC) for data.

In the present embodiment, link controller 320 is a hardware digital signal processor for performing baseband processing as well as other functions such as Quality-of-Service, asynchronous transfers, synchronous transfers, audio coding, and encryption. Link controller 320 has two major states: standby and connection. In addition, there are seven substates: page, page scan, inquiry, inquiry scan, master response, slave response, and inquiry response. The substates are interim states that are used to add new slaves to a piconet (FIG. 2A).

Continuing with reference to FIG. 3, in one embodiment, microcontroller 330 is an application specific integrated circuit (ASIC). In the Bluetooth embodiment, microcontroller 330 is a separate central processing unit (CPU) core for managing transceiver 308 and for handling some inquiries and requests without having to involve the host device. In the Bluetooth embodiment, microcontroller 330 runs software that discovers and communicates with other Bluetooth devices via the Link Manager Protocol (LMP). The LMP provides a number of services including sending and receiving of data, inquiring of and reporting a name or device identifier, making and responding to link address inquiries, connection setup, authentication, and link mode negotiation and setup. The LMP also can be used to place transceiver 308 in "sniff" mode, "hold" mode, "park" mode or "standby" mode.

The hold mode is a power saving mode that can be used for connected units if no data need to be transmitted. The sniff and park modes are also low power modes. In the sniff mode, a device listens to the piconet at a reduced rate (relative to the regular rate), thus reducing its duty cycle. The sniff interval is programmable and depends on the application. In the park mode, a device is still synchronized to the piconet but does not participate in the traffic.

In the present embodiment, before any connections between Bluetooth devices are created, all devices are in standby mode; that is, the standby mode is the default mode of a Bluetooth device. The standby mode is a low power mode in which an unconnected unit "listens" for messages at a regular rate (generally, every 2.56 seconds according to the Bluetooth specification) on a set of hop frequencies defined for that unit. Link controller 320 may leave the standby mode to scan for page or inquiry messages, or to transmit a page or inquiry message. When responding to a page message, the Bluetooth device enters the connection state as a slave. When carrying out a successful page attempt, the Bluetooth device enters the connection state as a master.

A connection between devices is made by a page message if the address is already known, or by an inquiry message followed by a page message if the address is unknown. The inquiry message enables the Bluetooth device to discover which other Bluetooth units are in range and what their addresses are, as well as other information such as their clocks and class-of-device. A "discoverable device" is a Bluetooth device in range that will respond to an inquiry (normally in addition to responding to a page). A discoverable device scans for inquiry messages, referred to as "inquiry scan." A "connectable device" is a Bluetooth device in range that will respond to a page.

With reference still to FIG. 3, in the present embodiment, interface 340 is for coupling transceiver 308 to Bluetooth-enabled device 390 in a suitable format. Transceiver 308 may be coupled by system bus 300 to Bluetooth-enabled device 390 (e.g., a host device such as a computer system or similar intelligent electronic device, a PDA, a printer, a fax machine, etc.), or transceiver 308 may be integrated into Bluetooth-enabled device 390.

Continuing with reference to FIG. 3, in the present embodiment, interface 340 runs software that allows transceiver 308 to interface with the operating system of Bluetooth-enabled device 390. In accordance with the present invention, interface 340 may be any of a variety of physical bus interfaces, including but not limited to a Universal Serial Bus (USB) interface, a Personal Computer (PC) Card interface, a Card-Bus or Peripheral Component Interconnect (PCI) interface, a mini-PCI interface, a Personal Computer Memory Card International Association (PCMCIA) interface, an Industry Standard Architecture (ISA) interface, or a RS-232 interface.

Figure 4:
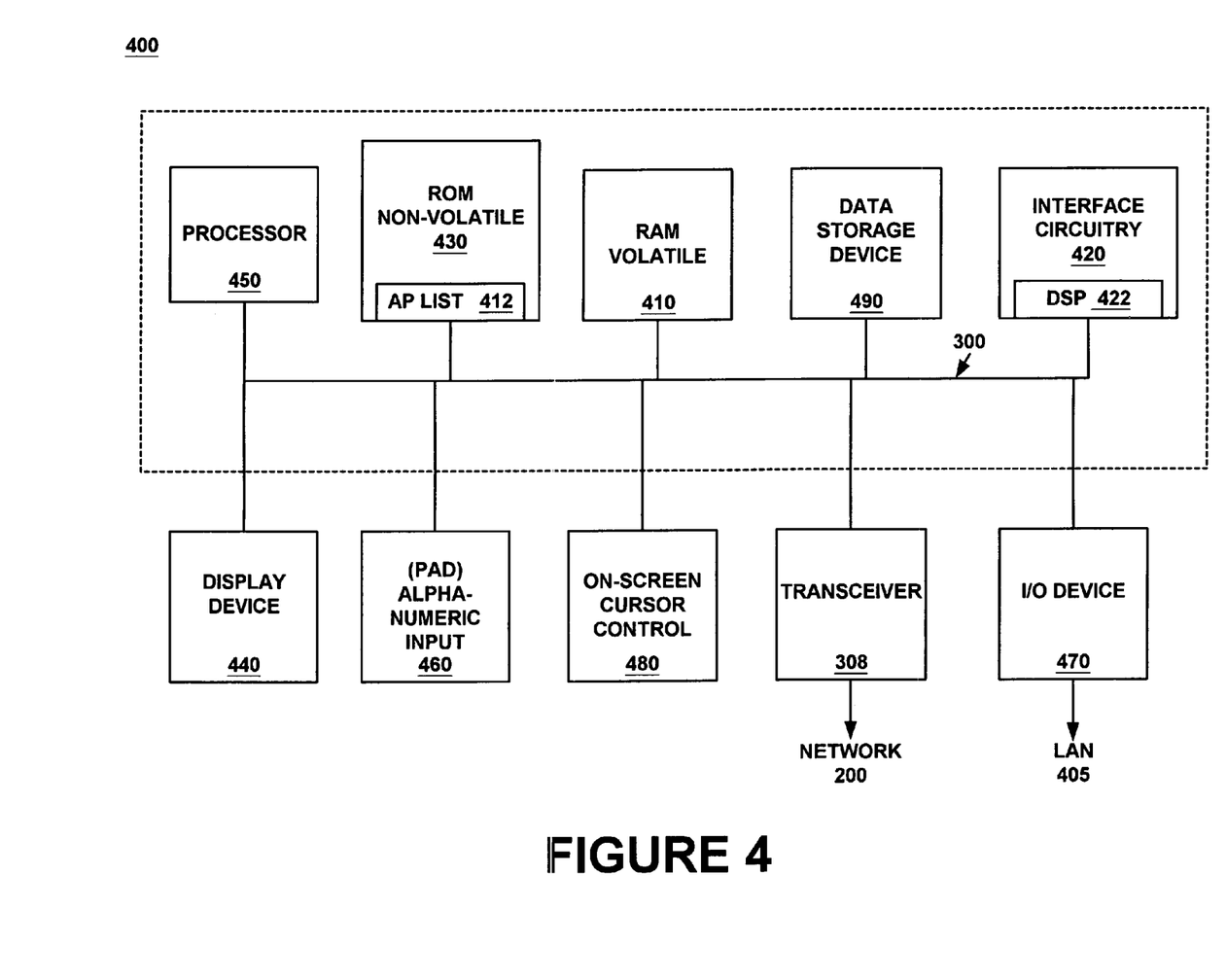
FIG. 4 is a block diagram of an exemplary portable computer system coupled to the Bluetooth wireless transceiver of FIG. 3 in accordance with one embodiment of the present invention.

FIG. 4 a block diagram of one embodiment of a Bluetooth enabled device that may be used as a LAN access point (e.g., devices 210 and 250 of FIG. 2B) in accordance with one embodiment of the present invention. In the present embodiment, the access point is a portable computer system 400; however, it is appreciated that the access point may be another type of intelligent electronic device. In the Bluetooth embodiment, portable computer system 400 is a Bluetooth-enabled device (e.g., device 390 of FIG. 3) coupled with a Bluetooth transceiver 308. As such, transceiver 308 enables central processor unit 101 to communicate with other electronic systems coupled to a network 200. It should be appreciated that within the present embodiment, input/output device 470, coupled to LAN 290, enables the portable computer system 400 to communicate with other electronic systems coupled with LAN 405.

Continuing with reference to FIG. 4, portable computer system 400 includes an address/data bus 300 for communicating information, a central processor 450 coupled with the bus 300 for processing information and instructions, a volatile memory 410 (e.g., random access memory, RAM) coupled with the bus 300 for storing information and instructions for the central processor 450, and a non-volatile memory 430 (e.g., read only memory, ROM) coupled with the bus 300 for storing static information and instructions for the processor 450. Volatile memory 430 includes a database list 412 of addresses for available wireless communication access points with which Bluetooth enabled device 400 may connect to a network. Portable computer system 400 also includes an optional data storage device 490 (e.g., a memory stick) coupled with the bus 300 for storing information and instructions. Device 490 can be removable. Portable computer system 400 also contains a display device 440 coupled to the bus 300 for displaying information to the computer user.

Portable computer system 400 also includes a signal transmitter/receiver (transceiver) device 308, which is coupled to bus 300 for providing a wireless radio (RF) communication link between portable computer system 400 and other wireless devices. In the Bluetooth embodiment, transceiver 308 is compliant with the Bluetooth specification; see FIG. 3.

In one embodiment, portable computer system 400 includes interface circuitry 420 coupled to bus 300. Interface circuitry 420 includes an optional digital signal processor (DSP) 422 for processing data to be transmitted or data that are received via transceiver 308. Alternatively, processor 450 can perform some or all of the functions performed by DSP 422.

Also included in computer system 400 is an optional alphanumeric input device 460 that, in one implementation, is a handwriting recognition pad ("digitizer"). Alphanumeric input device 460 can communicate information and command selections to processor 450 via bus 300. In one implementation, alphanumeric input device 460 is a touch screen device. Alphanumeric input device 460 is capable of registering a position where a stylus element (not shown) makes contact.

Portable computer system 400 also includes an optional cursor control or directing device (on-screen cursor control 480) coupled to bus 300 for communicating user input information and command selections to processor 450. In one implementation, on-screen cursor control device 480 is a touch screen device incorporated with display device 440. On-screen cursor control device 480 is capable of registering a position on display device 440 where a stylus element makes contact. The display device 440 utilized with portable computer system 400 may be a liquid crystal display (LCD) device, a cathode ray tube (CRT), a field emission display device (also called a flat panel CRT), or other display device suitable for generating graphic images and alphanumeric characters recognizable to the user. In the preferred embodiment, display device 440 is a flat panel display.

Figure 5:
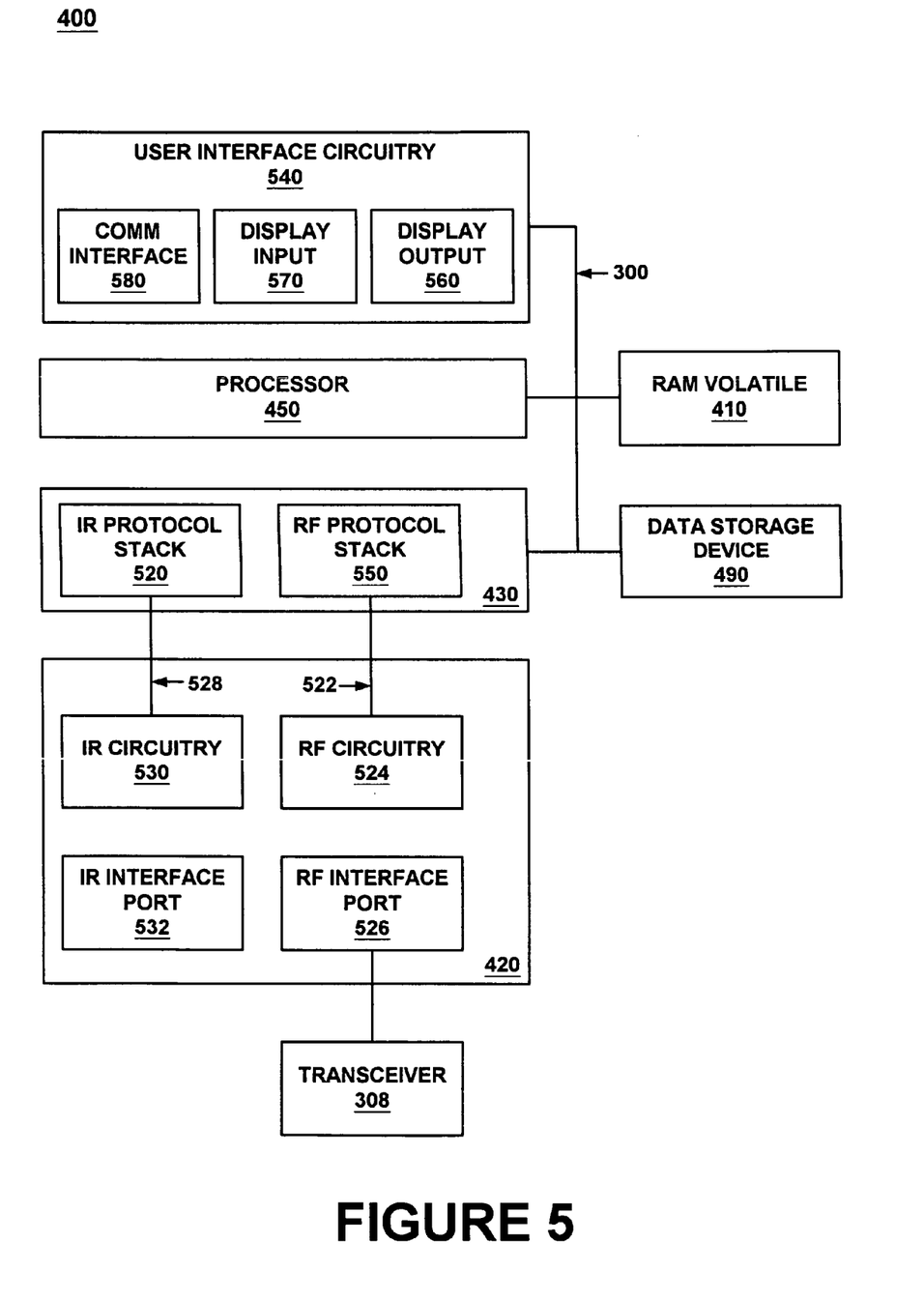
FIG. 5 is a block diagram showing features of the portable computer system of FIG. 4 in accordance with one embodiment of the present invention.

FIG. 5 is a block diagram showing additional features of portable computer system 400 in accordance with one embodiment of the present invention. User interface circuitry 540 is coupled to processor 450 via bus 300. User interface circuitry includes hardware and software components that provide user input and output resources for functions performed by processor 450. In the present embodiment, user interface circuitry 540 includes a display output 560, a display input 570, and communication interface 580.

In this embodiment, display output 560 receives digital information representing graphical information from processor 450, and converts the information to a graphical display, such as text and/or images, for display on display device 440 (FIG. 4), for example. Display input 570 may receive data inputs, such as graphical data inputs, from a user. The graphical data inputs can be entered by the user with a stylus element on the pressure-sensitive display device 440 (specifically, on-screen cursor control device 480, FIG. 4) or the alphanumeric input device 460 (FIG. 4).

The communication interface 580 allows the user to enter other types of data, such as audio or video data, or data formatted for operation with particular applications executed by portable computer system 400, such as calendar data, electronic mail data, word processing, databases, and the like. In one embodiment of the present invention, the communication interface 580 is a serial communication port, but could also alternatively be of any of a number of well-known communication standards and protocols, e.g., parallel, SCSI (small computer system interface), Firewire (IEEE 1394), Ethernet, etc.

Host interface circuitry 420 is coupled to processor 450 via bus 300. Host interface circuitry 420 (or link interface circuitry or data interface circuitry) illustrates, but is not limited to, two alternative link interface ports for establishing a wireless link to another device: an RF interface port 526 and an infrared (IR) interface port 532.

In the present embodiment, RF circuitry 524 converts signals to radio frequency output and accepts radio frequency input via RF interface port 526. In the Bluetooth embodiment, RF interface port 526 is a Bluetooth transceiver 308 (FIG. 3). RF signals received by RF circuitry 524 are converted to electrical signals and relayed to RF protocol stack 550 via connection 522.

In the present embodiment, IR circuitry 530 converts signals into infrared output and accepts infrared input via IR interface port 532. Infrared communication signals received by IR circuitry 530 are converted to electrical signals that are relayed to IR protocol stack 520 via connection 528.

Processor 450 is capable of executing RF protocol stack 550 and IR protocol stack 520. IR stack 520 implements an IR protocol to support infrared links with other devices.

Figure 6:
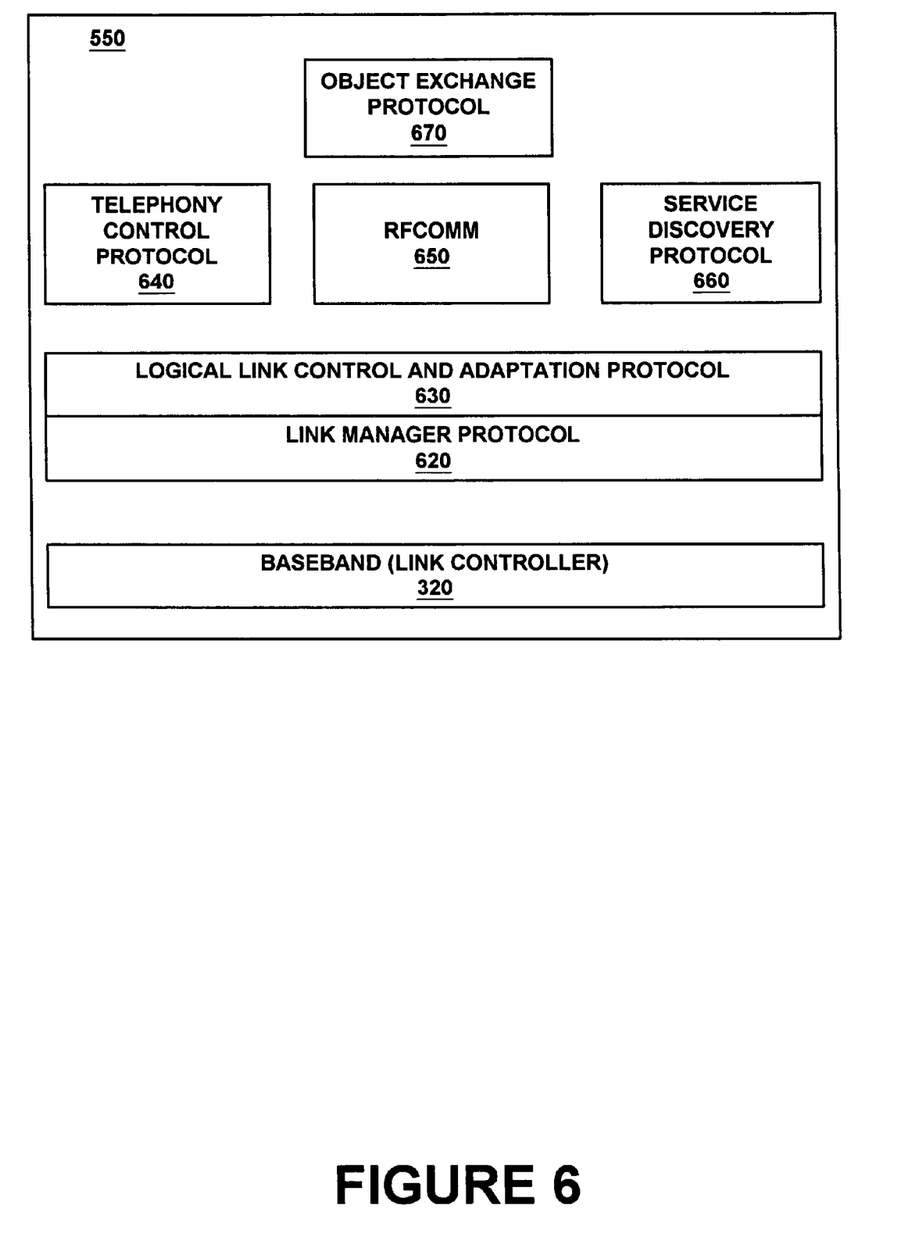
FIG. 6 is a block diagram illustrating a protocol stack used by a Bluetooth-enabled device in accordance with one embodiment of the present invention.

FIG. 6 is a block diagram illustrating the layers of the RF protocol stack 550 used by a Bluetooth-enabled device such as portable computer system 400 of FIG. 4 in accordance with one embodiment (the Bluetooth embodiment) of the present invention. The layers of RF protocol stack 550 include baseband (link controller) layer 320, Link Manager Protocol (LMP) layer 620, Logical Link Control and Adaptation Protocol (L2CAP) layer 630, Telephony Control Protocol (TCS) layer 640, RFCOMM layer 650, Service Discovery Protocol (SDP) layer 660, and Object Exchange Protocol (OBEX) layer 670.

Continuing with reference to FIG. 6, in the present embodiment, baseband layer 320 carries out baseband protocols and other low-level link routines. LMP layer 620 is used for link set-up, security and control. L2CAP layer 630 supports higher level protocol multiplexing, packet segmentation and reassembly, and the conveying of quality-of-service information. TCS layer 640 defines the call control signaling for the establishment of speech and data calls between Bluetooth devices. RFCOMM layer 650 provides emulation of serial ports over the L2CAP protocol 630. SDP layer 660 provides a means for applications to discover which services are available, and the characteristics of the services. OBEX layer 670 enables the exchange of data objects. Additional information is provided by "Specification of the Bluetooth System, Core," version 1.0B, dated Dec. 1, 1999, herein incorporated by reference in its entirety.

Figure 7:
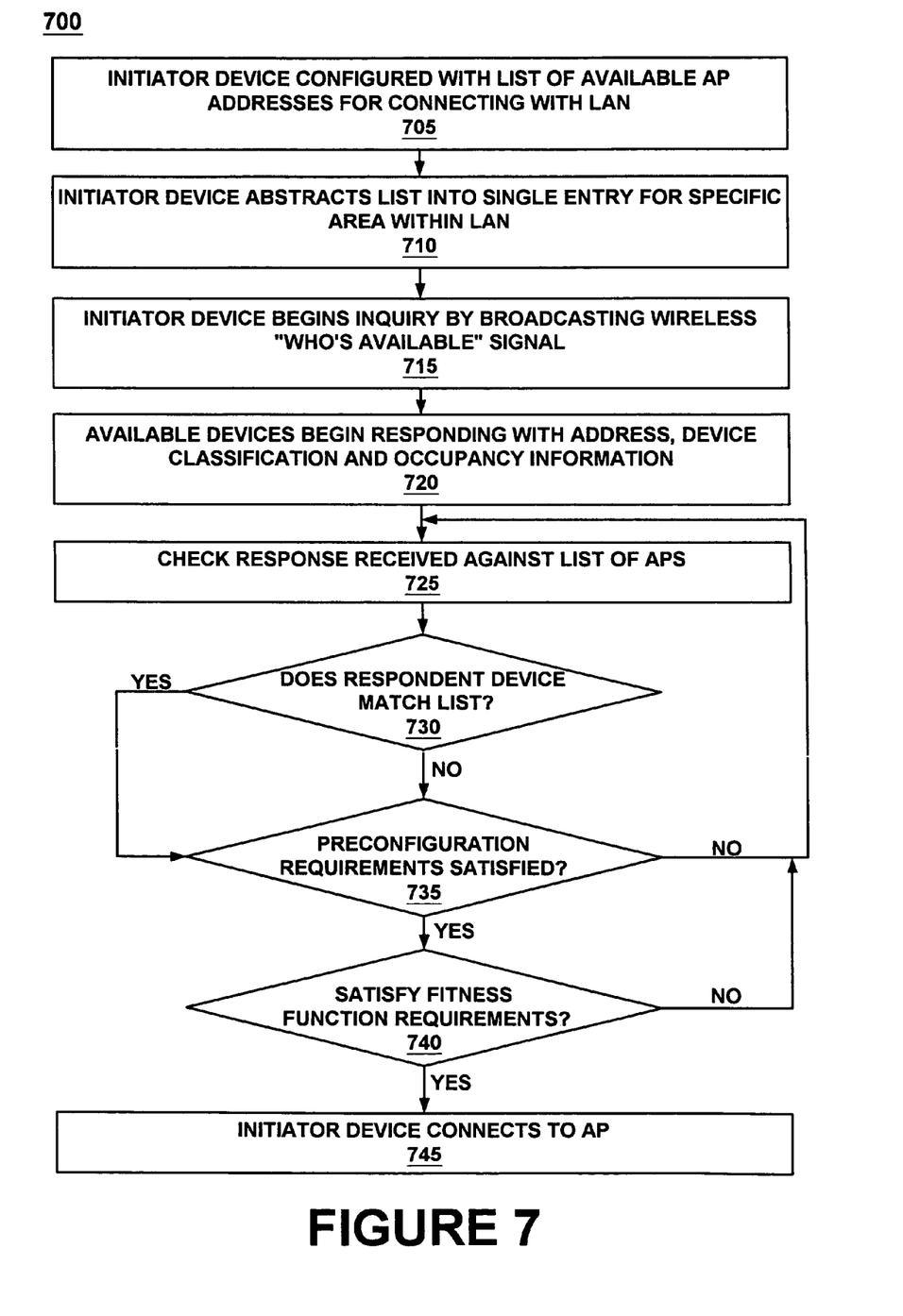
FIG. 7 is a flowchart of a process for intelligently selecting and connecting to an access point in accordance with one embodiment of the present invention.

FIG. 7 is a flowchart of a process 700 for intelligently selecting and connecting to an access point in accordance with an embodiment of the present invention. Flowchart 700 includes processes of the present invention which, in one embodiment, are carried out by a processor and electrical components under the control of computer readable and computer executable instructions. The computer readable and computer executable instructions may reside, for example, in data storage features such as computer usable volatile memory 410 and/or computer usable non-volatile memory 430 of FIG. 4. However, the computer readable and computer executable instructions may reside in any type of computer readable medium. Although specific steps are disclosed in flowchart 700, such steps are exemplary. That is, the present invention is well suited to performing various other steps or variations of the steps recited in FIG. 7. Within the present embodiment, it should be appreciated that the steps of flowchart 700 can be performed by software or hardware or any combination of software and hardware. In the Bluetooth embodiment, the initiator device is Bluetooth enabled (e.g., Bluetooth enabled device 390 of FIG. 3).

In step 705 of FIG. 7, the initiator device is configured with a list (e.g., list 412 of FIG. 4) of available access point (AP) addresses for connecting with a local area network (LAN). It should be appreciated that the configuration of the initiator device may be performed by the user of the device, using a supplied list, or it may be configured by a computer hardware/software administrator or other personnel with knowledge of available hardware and downloaded to the device. It is understood that the device may be preconfigured with a list of access point addresses that are pre-allocated so as to limit the access points available to a device in order to balance the occupancy load in a physical location. The access point addresses are unique identifiers with which each device identifies itself.

In step 710 of FIG. 7, the initiator device abstracts the list into a single entry or abstracted name containing the grouping of access point addresses the device is most likely to connect with. This automates the selection process so that when a user of the initiator device indicates that he wishes to connect to the network by selecting the single entry or abstracted name, the device would select the grouping of access points from the abstracted list.

With reference to step 715 in the present embodiment, the initiator device begins an inquiry by broadcasting a wireless signal to all devices within the signal range requesting that they respond if available. This "who's available" signal may be initiated by a user of the initiator device or the signal may be sent automatically upon entering an area (e.g., office complex, building or mall) containing responsive devices.

In step 720 of FIG. 7, available respondent devices, upon receiving the "who's available" signal, respond with their address, device classification and, in the case of access points, occupancy information. The device classification contains information about what type of device it is and the occupancy information indicates how busy the device is. It should be appreciated that other device information may also be made available. Information such as respondent device's physical location and signal strength may, for certain devices, also be broadcast as part of the respondent device response.

In step 725 of FIG. 7, the initiator device checks the first response it receives against the list of AP addresses. If the respondent device's address is contained in the list, according to one embodiment, the initiator device continues to accumulate a set of device addresses which are on the list until a preconfigured number, x, is accumulated. In another embodiment, the initiator device continues to accumulate a set of device addresses for a preconfigured time period. The process proceeds to step 740 and a check is made for satisfaction of fitness function requirements. If a first respondent device's address is not contained within the initiator device's AP list, the initiator device checks the next respondent device address against the AP address list, and so on. This process continues until a respondent device's address is found within the AP address list. Once found, the process proceeds to step 735 where it continues until a set of x devices are accumulated or until the set of all devices for which addresses are found in a preconfigured time interval (seconds) are accumulated, at which time it proceeds to step 740 for a check against fitness function requirements.

Now referring to step 740 of FIG. 7, the initiator device checks the respondent device or set of devices for satisfaction of any predefined fitness function requirements. It is appreciated that, depending on the preconfiguration as described above, this check could be made for a single device for which an address was found in the AP list, or for a set of devices such as a number, x, of devices for which addresses were found in the AP address list, or for the set of devices for which an address was found in the list within a preconfigured period of time (seconds). It is possible that no fitness functions will have been predefined, in which case the initiator device would proceed to step 745 and connect to the first respondent device for which an address was located within the list of AIP addresses. The fitness function may be a predefined value for the respondent device occupancy level (how busy it is). According to the present embodiment a fitness function requirement may be that the respondent device have signal strength greater than a predetermined value. The fitness function may also require that the respondent device be within a predetermined physical distance of the initiator device. It is also possible to bias the fitness function requirements so as to balance the occupancy load in a particular location. It should be appreciated that these and any number of other requirements not expressly described herein may be implemented as fitness factor requirements for selecting and connecting to an access point. If the respondent access point device satisfies the fitness function requirement(s), the process proceeds to step 745. In the case of a single respondent device being considered, if the respondent device does not satisfy the fitness function requirement(s), the process returns to step 725 to check the next response. This process continues until the fitness function requirement(s) are satisfied, at which point the process proceeds to step 745.

In the case of a set of respondent access points, the initiator device may require a comparison of all the access point devices within the set. For example, if occupancy rate is a fitness function requirement, the access point with the lowest occupancy in the set would be considered to satisfy the fitness function requirement. Likewise, the signal strength fitness function requirement may be the access point with the strongest signal of the devices in the set and the physical distance requirement may be the closest access point of tose within the set.

In step 745 of FIG. 7, once a respondent device has been located within the list of AIP addresses on the initiator device, and has been determined to satisfy any fitness function requirements, the initiator device is connected to the respondent access point.

Figure 8:
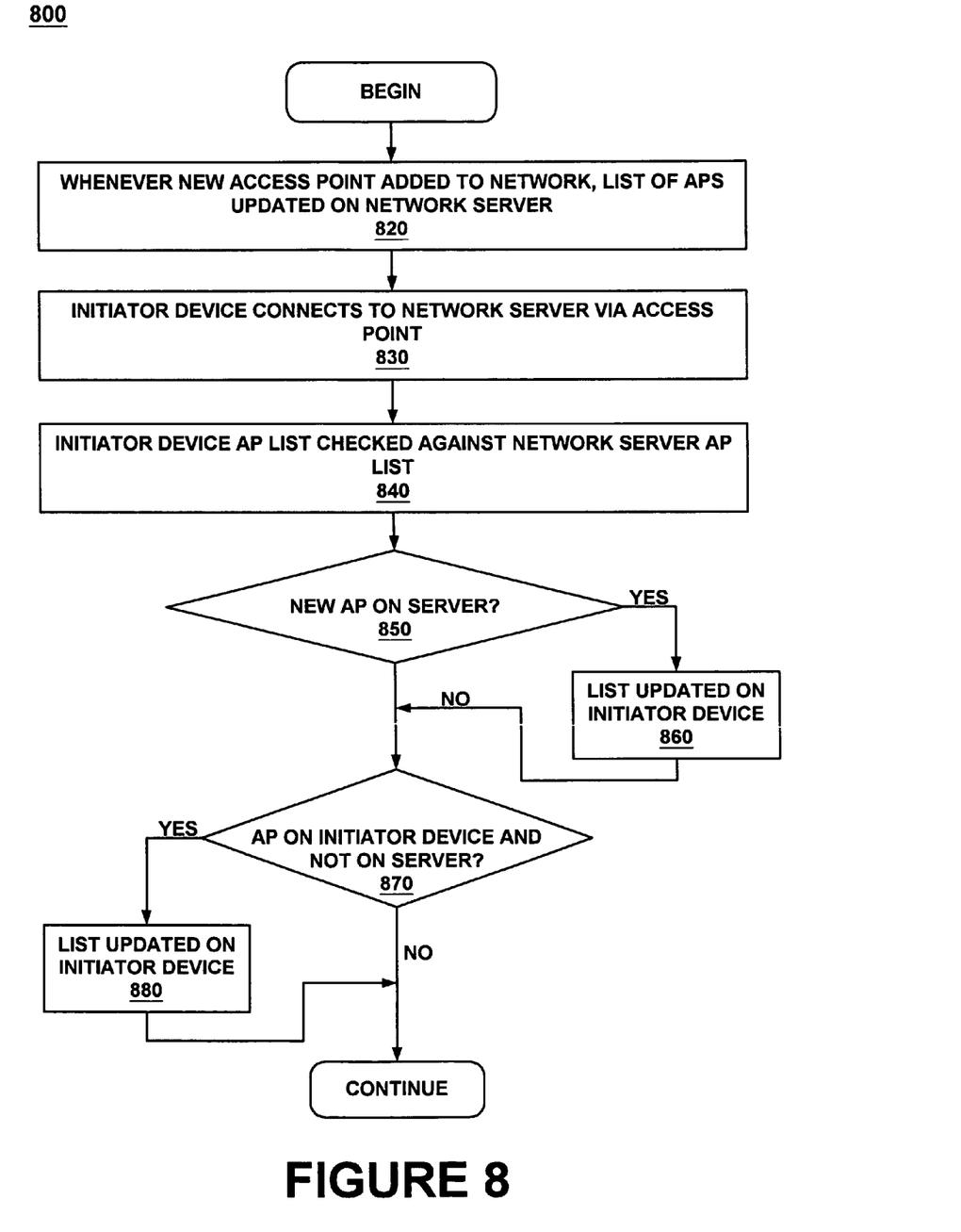
FIG. 8 is a flowchart of a process for updating a list of available access points on a wireless device in accordance with one embodiment of the present invention.

FIG. 8 is a flowchart of the steps for automatically updating a list of available network access points on an initiator device in accordance with one embodiment of the present invention. Flowchart 800 includes processes embodiments of the present invention which, in one embodiment, are carried out by a processor and electrical components under the control of computer readable and computer executable instructions. The computer readable and computer executable instructions may reside, for example, in data storage features such as computer usable volatile memory 410 and/or computer usable non-volatile memory 430 of FIG. 4. However, the computer readable and computer executable instructions may reside in any type of computer readable medium. Although specific steps are disclosed in flowchart 800, such steps are exemplary. That is, the embodiments are is well suited to performing various other steps or variations of the steps recited in FIG. 8. Within the present embodiment, it should be appreciated that the steps of flowchart 800 can be performed by software or hardware or any combination of software and hardware.

In step 820 of FIG. 8, it is shown that, whenever a new access point is added to a network, a list containing the access point address is updated on a network server to include the address of the newly added access point. This update may be performed manually or may be automated by software executed by the network server processor (e.g., processor 450 of FIG. 4).

According to step 830 of process 800 of the present embodiment, an initiator device containing a preconfigured list of access point (AP) addresses connects to the network server via an access point using a process such as process 700 of FIG. 7. Once connected to the network server, the initiator device compares its AIP address list to the network AIP address list on the network server.

According to steps 850 and 860 of FIG. 8, if there is an AIP address within the network AIP address list contained on the network server that does not exist on the initiator device AIP address list, the initiator device AIP address list is updated by adding the new address to the AIP address list. The process then proceeds to step 870. If there is no new AP in the network AIP address list, the process skips step 860 and moves to step 870.

If, in step 870 of FIG. 8, the initiator device finds that an address exists on the initiator device that is not within the network AIP address list, the initiator device list is updated by removing the AIP address not found within the network AIP address list. The process 800 is then repeated with each connection to the network server. Thus the AIP address list on the initiator device is kept current with any newly installed or removed access point device.

In summary, embodiments of the present invention provide a user-friendly system and method for intelligently selecting and connecting to a Bluetooth access point. The present embodiments invention also provide a system and method for updating a list of access points on a Bluetooth device. In addition, the present embodiments provide a system and method that can be implemented in Bluetooth-enabled devices, that is consistent with the Bluetooth specification, and that can be incorporated into legacy Bluetooth devices.

In one embodiment of the present invention, a method for intelligently selecting a Bluetooth access point from a plurality of available points, is thus described. While the present invention has been described in particular embodiments, it should be appreciated that the present invention should not be construed as limited by such embodiments, but rather construed according to the following claims.

What is claimed is:

1. A method of connecting to a wireless communication access point comprising:
   a) an initiator device broadcasting a first wireless message to a plurality of potential access point devices, said initiator device storing therein a list of recognized device addresses for connecting thereto;
   b) in response to said initiator device broadcasting said first wireless message, said initiator device receiving a plurality of second wireless messages from a set of said plurality of potential access point devices, wherein said set of said plurality of potential access point devices is defined by at least one physical characteristic;
   c) said initiator device comparing device addresses of said plurality of second wireless messages for address matches with said list of recognized device addresses, and wherein said list of recognized device addresses is compared, by said initiator device, to a list of current network access point addresses maintained on a network server, any differences being updated within said list of recognized device addresses in a memory cache of said initiator device;
   d) applying a fitness function to address matches of said c) to determine a selectable address, wherein said fitness function defines an acceptable criteria for determining said selectable address; and
   e) transmitting a signal to connect to an access point device corresponding to said selectable address.

2. The method as described in claim 1 wherein set of said physical characteristic is defined by a quantity of device threshold.

3. The method as described in claim 1 wherein set of said physical characteristic is defined by a time of discovery threshold.

4. The method as described in claim 1 wherein said criteria is an occupancy level less than a predetermined threshold.

5. The method as described in claim 1 wherein said criteria is signal strength greater than a predetermined threshold.

6. The method as recited in claim 1 wherein said criteria is residing within a predetermined physical distance.

7. The method as recited in claim 1 wherein said initiator device and said responding device are Bluetooth-enabled devices.

8. The method of claim 1 wherein said initiator device abstracts said list of access point addresses into a single abstract name.

9. A wireless communication device comprising:
   a bus;
   a wireless transceiver unit coupled to said bus for communicating with responding devices;
   a memory cache coupled to said bus; and
   a processor coupled to said bus, said processor for performing a method for selecting and connecting to a responding access point device, said method comprising:
   a) an initiator device broadcasting a first wireless message to a plurality of potential access point devices, said initiator device storing therein a list of recognized device addresses for connecting thereto;
   b) in response to said initiator device broadcasting said first wireless message, said initiator device receiving a plurality of second wireless messages from a set of said plurality of potential access point devices, wherein said set of said plurality of potential access point devices is defined by at least one physical characteristic;
   c) said initiator device comparing device addresses of said plurality of second wireless messages for address matches with said list of recognized device addresses, wherein said list of recognized device addresses is compared, by said initiator device, to a list of current network access point addresses maintained on a network server, any differences being updated within said list of recognized device addresses in a memory cache of said initiator device;
   d) applying a fitness function to address matches of said c) to determine a selectable address, wherein said fitness function defines an acceptable criteria for determining said selectable address; and
   e) transmitting a signal to connect to an access point device corresponding to said selectable address, wherein said initiator device is said wireless communication device.

10. The device as described in claim 9 wherein set of said physical characteristic is defined by a quantity of device threshold.

11. The device as described in claim 9 wherein set of said physical characteristic is defined by a time of discovery threshold.

12. The device as described in claim 9 wherein said criteria is an occupancy level less than a predetermined threshold.

13. The device as described in claim 9 wherein said criteria is signal strength greater than a predetermined threshold.

14. The device as recited in claim 9 wherein said criteria is residing within a predetermined physical distance.

15. The device as recited in claim 9 wherein said initiator device and said responding device are Bluetooth-enabled devices.

16. The device of claim 9 wherein said initiator device abstracts said list of access point addresses into a single abstract name.

* * * * *